Sept. 3, 1946.　　　　D. A. KAHN　　　　2,407,160

SELF-LOCKING BOLT

Filed Jan. 10, 1945

Inventor
David A. Kahn
By Frank C. Maley
Agent

Patented Sept. 3, 1946

2,407,160

UNITED STATES PATENT OFFICE 2,407,160

SELF-LOCKING BOLT

David A. Kahn, Columbus, Ohio

Application January 10, 1945, Serial No. 572,229

2 Claims. (Cl. 151—7)

This invention relates to improvements in self-locking bolts of the character of ordinary screw bolts, threaded studs and the like, which are adapted to receive nuts thereon or to be secured in a threaded opening.

Various self-locking bolts have been proposed heretofore, but these have not been entirely satisfactory because they provided ineffectively for the securing of the nut on the threaded shank, or so weakened the shank that it would not effectively retain the load imposed thereon by the nut or threaded connection.

The object of this invention is to improve the construction of self-locking bolts and the like, while holding to a minimum the accompanying loss of strength, particularly the pull-out strength of the screw when the threads engage a nut or a tapped hole.

This is accomplished preferably by slotting the threaded portion of the bolt shank throughout a portion of the length thereof, and expanding the slotted portion throughout a part only of the length so as to leave the entrance end of the bolt unexpanded to facilitate its entrance into a nut or tapped role, and filling the slotted portion with a resilient or plastic material so that the nut will fit the bolt forcefully and thus will be retained securely on the shank. The slot extends only in the threaded portion of the shank so that no loss in shear strength will result, and the filling of resilient or plastic material will maintain the expanded yieldable fit on the nut or tapped hole throughout the life of the bolt without the danger that the shank will be bent back to its normal position.

I have illustrated different embodiments of this invention in the accompanying drawing, in which.

The bolt shown in Figs. 1 to 4 is of the usual type, having an elongated shank which is provided with a head 2 on one end thereof, while the opposite end of said shank is externally screw-threaded at 3 to receive a nut 4.

The threaded portion 3 of the shank is formed in the usual manner with an external diameter equal to the external diameter of the unthreaded portion of the shank, by the cutting of standard screw threads in the periphery of the shank from the end thereof, backward throughout only a portion of its length. This is a conventional bolt. The nut 4 is likewise of the conventional type, having an internally threaded opening corresponding substantially with the threaded portion 3 of the shank, adapted to be screw-threaded thereon, and having the threads in the opening of the nut corresponding substantially with the threaded portion of the shank, slightly oversize for relatively free turning on said threaded shank.

Figure 1:
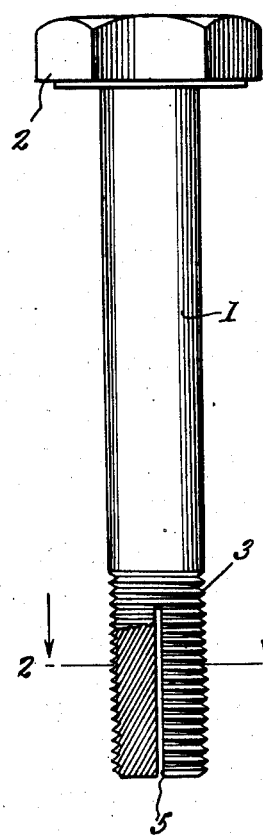
Fig. 1 is a side elevation, partly in section, of a bolt, showing the slotting of the shank thereof in accordance with this invention.
Figure 3:
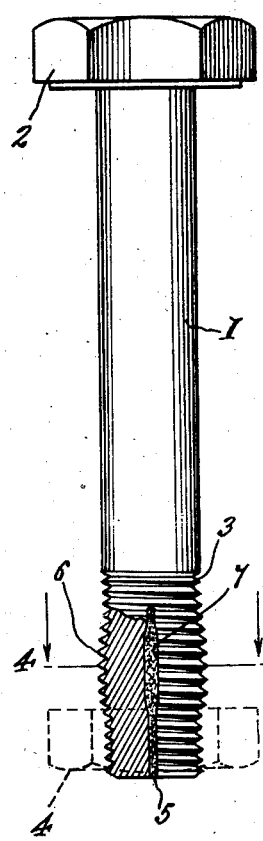
Fig. 3 is a view similar to Fig. 1 showing the expanded shank with the filling therein.

According to this invention, I have provided for a tight fit between the threaded shank 3 and the nut 4 to maintain a locked relation therebetween. This is accomplished by providing a slot 5 in the threaded portion 3 of the shank from the extreme free end thereof inwardly toward the opposite end of the threaded portion, but terminated short of the end of said threaded portion, as shown in Figs. 1 and 3. The portion of the threaded shank is then deformed or expanded, as indicated generally at 6 in Figs. 3 and 4 so as to increase its external diameter to a sufficient degree that the nut 4 which would normally fit the threaded portion 3 can be applied to this portion 6 only as a forced fit thereon. This expanded portion 6 extends throughout only the intermediate portion of the threaded shank, leaving an unexpanded portion at the end of the shank so that the nut will start freely on the threads. The expanding of the intermediate portion will not deform the threads nor cause difficulty in turning of the nut thereon, because the expanding action is uniform circumferentially and the sides are not stretched out of alignment.

To maintain the expanded relation of the slot, it is filled with a suitable resilient or plastic material, designated generally at 7, such for instance, as vulcanized fiber or other thermo-plastic which will have some degree of elasticity, and yet sufficient rigidity to maintain the expanded relation of the section 6 of the threaded shank. This filling leaves the shank substantially slotted and preserves the strength thereof without loss from the slotting action and without danger that the expanded portion will yield and pull out of the nut or tapped hole engaged thereby. Where the unthreaded portion of the shank experiences shear loads, the slot extends only throughout the threaded portion thereof so that no loss in shear strength will result, and yet the nut will be effectively locked in place thereon, by reason of the expanded portion of the threaded shank with the filling contained therein.

If the fiber or other filling used be of such character that it would not readily adhere to the sides of the slot, a suitable element may be used for secure adhesion therebetween to hold the filling in place.

Figure 5:
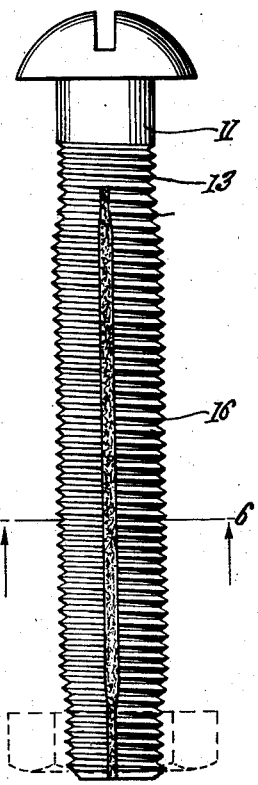
Fig. 5 is a side elevation of a machine screw embodying this invention.
Figures 2, 4:
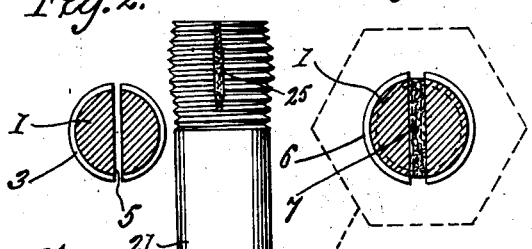
Fig. 2 is a cross-section therethrough on the line 2—2 of Fig. 1.
Fig. 4 is a cross-section therethrough on the line 4—4 of Fig. 3.

The invention may be applied where the threaded portion extends substantially throughout the length of the shank, as for instance with machine screws, as shown in Fig. 5, and indicated generally at 11. In this form, the threaded portion 13 has the expanded part thereof indicated at 16, extending throughout a substantial portion of the length of the shank, being maintained in expanded relation by the resilient or plastic filling 17.

Figure 6:
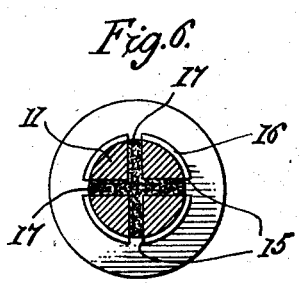
Fig. 6 is a cross-section therethrough on the line 6—6 of Fig. 5.

In this form also, it is preferred that the bolt shank be expanded in two directions, which is made possible by the cross-slotting thereof, as indicated at 15 in Fig. 6. Even if slotted in this manner, the filling of plastic material maintains the rigidity and strength of the bolt without substantial loss by reason of the provision for locking the nut thereon.

Figure 7:
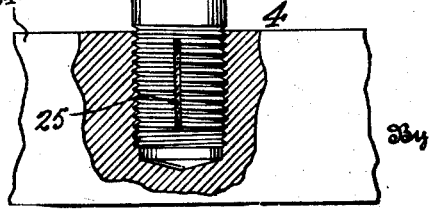
Fig. 7 is a vertical section, partly in elevation, showing the application of this invention to a threaded stud.

Fig. 7, the invention is shown applied to a threaded stud 21, both ends of which are slotted at 25 and filled with plastic or other material described above. The stud engages in a tapped hole in the work 24.

It is possible with modern machine tooling to slot the bolt without removing an appreciable quantity of material which further tends to hold to a minimum, the loss of strength by the expanding action thereby obtained.

I claim:

1. A bolt member comprising an elongated shank externally threaded with the threads extending substantially continuously throughout the circumference of the shank, said shank having a slot therethrough from side to side and extending lengthwise in the threaded portion thereof and said slotted portion in a region spaced from the threaded end of the member being expanded diametrically to a larger diameter than the remainder of the shank between said expanded portion and the threaded end of the shank, and resilient plastic material substantially filling the slotted and expanded portion of the shank throughout and maintaining the expanded condition thereof.

2. A bolt member comprising an elongated shank externally threaded at one end thereof with the threads extending substantially continuously through the circumference of the shank, said shank having a slot therethrough from side to side and extending lengthwise from said end of the shank in the threaded portion thereof and toward the opposite end of the shank and said slotted portion in a region spaced from the slotted end of the shank being expanded diametrically to a larger diameter than the remainder of the shank between said expanded portion and the threaded end of the shank, and resilient plastic material substantially filling the slotted and expanded portion of the shank throughout and maintaining the expanded condition thereof.

DAVID A. KAHN.